US006931516B2

(12) United States Patent
Douglas et al.

(10) Patent No.: US 6,931,516 B2
(45) Date of Patent: Aug. 16, 2005

(54) PIPELINED INSTRUCTION DECODER FOR MULTI-THREADED PROCESSORS

(75) Inventors: Jonathan P. Douglas, Portland, OR (US); Daniel J. Deleganes, Hillsboro, OR (US); James D. Hadley, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1 day.

(21) Appl. No.: 10/615,918

(22) Filed: Jul. 8, 2003

(65) Prior Publication Data

US 2004/0107336 A1 Jun. 3, 2004

Related U.S. Application Data

(63) Continuation of application No. 09/475,105, filed on Dec. 30, 1999, now Pat. No. 6,609,193.

(51) Int. Cl.[7] .................................................. G06F 9/38
(52) U.S. Cl. ....................... 712/219; 712/208; 713/322; 718/107
(58) Field of Search ............................... 712/208, 219; 713/322; 718/107

(56) References Cited

U.S. PATENT DOCUMENTS

| | | | |
|---|---|---|---|
| 5,357,617 A | 10/1994 | Davis et al. ................. | 712/245 |
| 5,778,246 A | 7/1998 | Brennan ....................... | 712/23 |
| 5,890,008 A | 3/1999 | Panwar et al. ................ | 712/15 |
| 5,913,049 A | 6/1999 | Shiell et al. ................. | 712/215 |
| 5,983,339 A | 11/1999 | Klim ........................... | 712/200 |
| 6,026,476 A | 2/2000 | Rosen .......................... | 711/206 |
| 6,357,016 B1 | 3/2002 | Rodgers et al. .............. | 713/601 |
| 6,385,719 B1 | 5/2002 | Derrick et al. ............... | 712/235 |
| 6,594,755 B1 * | 7/2003 | Nuechterlein et al. ....... | 712/239 |
| 6,754,808 B1 * | 6/2004 | Roth et al. ................... | 712/218 |

FOREIGN PATENT DOCUMENTS

WO     WO93/01545     7/1992

OTHER PUBLICATIONS

Eugene R. Hnatek; Random–Access Memories and Content–Addressable Memories, A User's Handbook of Semiconductor Memories; 19971 pp. 591–608; Wiley–Interscience Pub.

William Stallings;7.3 Memory Management, computer Organization and Architecture, Designing for Performance, 4th Edition; 1996; pp. 240–263; Prentice Hall NJ.

Hamcher, Veranesic & Zaky; The Main Memory, Computer ORganization, 2nd Edition; 1984; pp. 306–329; McGraw–Hill Book Company.

Patterson & Hennessy; Memory–Hierachy Design, Computer Architecture: A Quantitative Approach; 1990 pp. 408–475; Morgan Kaufmann Pub.; San Mateo, CA.

(Continued)

*Primary Examiner*—Kenneth S. Kim
(74) *Attorney, Agent, or Firm*—Blakely, Sokoloff, Taylor and Zafman

(57) ABSTRACT

A pipelined instruction decoder for a multithread processor including an instruction decode pipeline, a valid bit pipeline, and a thread identification pipeline in parallel together, with each having the same predetermined number of pipe stages. The instruction decode pipeline to decode instructions associated with a plurality of instruction threads. The valid bit pipeline to associate a valid indicator at each pipe stage with each instruction being decoded in the instruction decode pipeline. The thread identification pipeline to associate a thread-identification at each pipestage with each instruction being decoded in the instruction decode pipeline. The pipelined instruction decoder may further include a pipeline controller to control the clocking of each pipe stage of the instruction decode pipeline, the valid bit pipeline, and the thread identification pipeline. The pipeline controller may invalidate an entire thread of instructions, squeeze out invalid instructions, and/or conserve power by selectively stopping the clocking of pipestages.

22 Claims, 11 Drawing Sheets

OTHER PUBLICATIONS

Richard Kain; Advanced Computer Architecture: A Systems Design Approach; 1996; pp. 75–88 and 456–474; Prentice Hall, Englewood Cliffs, NJ.

Jean–Loup Baer; computer Systems Architecture; 1980 pp. 139–166 and 315–325; Computer Sceince Press; Rockville, MD.

* cited by examiner

Stall for Next to Last PipeStage (NLP)
Stall (NLP) = Valid Instruction in Pipe(NLP) AND (ThreadId (NLP) = ThreadId of Stall)

Stall for any other PipeStageX
Stall(X) = Valid Instruction in Pipe(X) AND Valid Instruction in Pipe(X+1) AND Stall(NLP)

Powerdown for any PipeStage X
Powerdown(X) = NOT Valid Instruction in Pipe(X-1)

Clock Enable for any PipeStage X
Clock(X) = NOT Stall(X) AND NOT Powerdown(X)

Clear for any PipeStage X
Clear(X) = Clock(X) AND [(ClearThread(Id0) AND (ThreadId(X-1) = Id0)) OR (ClearThread(Id1) AND (ThreadId(X-1) = Id1))]
OR
NOT Clock(X) AND [(ClearThread(Id0) AND (ThreadId(X) = Id0)) OR (ClearThread(Id1) AND (ThreadId(X) = Id1))]

ClearThread (Id0) = There was a Clear on Thread Identification 0
ClearThread (Id1) = There was a Clear on Thread Identification 1

Pipe(X) = Any pipestage in the decode
Pipe(X-1) = Pipestage before Pipe(X)
Pipe(X+1) = Pipestage after Pipe(X)

*FIG. 7*

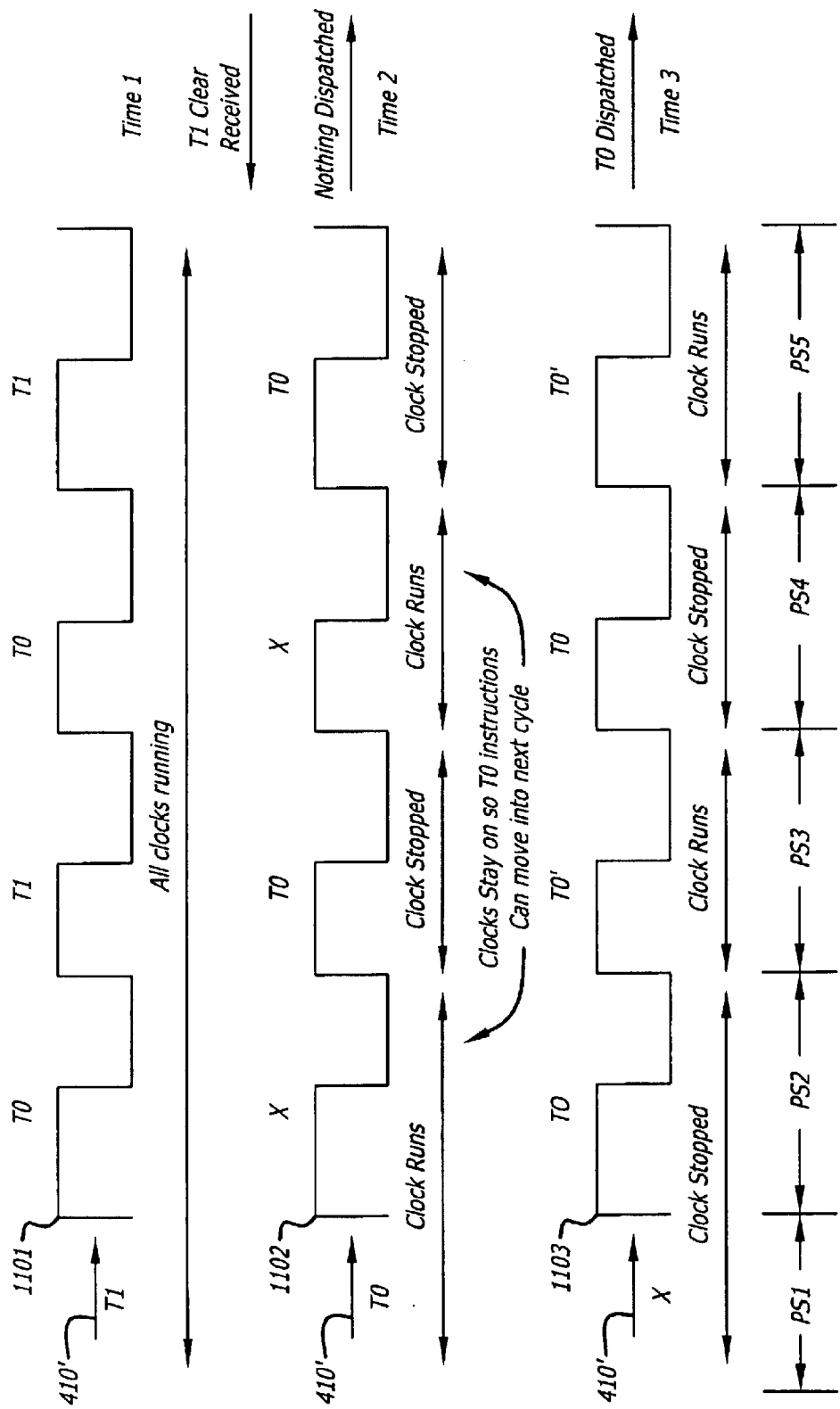

PIPELINED INSTRUCTION DECODER FOR MULTI-THREADED PROCESSORS

CROSS REFERENCE TO RELATED APPLICATION

This application claims the benefit and is a continuation of U.S. patent application Ser. No. 09/475,105, filed Dec. 30, 1999 by Jonathan Douglas et al., now issued as U.S. Pat. No. 6,609,193.

BACKGROUND OF THE INVENTION

1. Field of the Invention

The present invention relates generally to instruction decoding for computer processors, and more specifically to pipelined instruction decoders for microprocessors.

2. Background Information

Basic instruction decoders and instruction decoding techniques used in central processors and microprocessors are well known. With advancements in design, instruction decoders have become more sophisticated to include not only pipeline registers to process instructions in sequence but buffers to temporarily store preliminary decoded instructions while others instructions continue to be processed. However, buffers have limited depth and can become filled so that further instructions can no longer be stored into them. In prior art processors when a buffer became full, the entire instruction decode pipeline would stall. Stalls can occur for other reasons in a microprocessor when a subsystem can not handle the amount of data throughput provided by previous subsystems so data is not lost. Essentially, an instruction decode pipeline is stalled when no further instructions can be decoded in the instruction decode pipeline.

Also in prior art processors, if an instruction became stale or invalid in the instruction decode pipeline, such as from a cache coherency problem, it required clearing. Clearing essentially invalidates the instructions so that they can be disregarded and overwritten with valid instructions. In prior art processors, all instructions, including valid instructions, are cleared (i.e. invalidated) within the instruction decode pipeline on a global basis. In which case, valid instructions which have been cleared need to input back into the beginning of the instruction decode pipeline to start the decoding process again. Global clearing such as this tends to delay the execution process when a stale or invalid instruction becomes present in the pipeline of prior art processors.

In processors, reducing power consumption is an important consideration. In order to conserve power in prior art processors, entire functional blocks of synchronous circuitry within the execution unit have their clocks turned OFF. That is, their clock signals are set to a stable state throughout entire functional blocks. In order to accomplish this, prior art power down control logic was used to determine when an entire functional block is idle and can have its clocks shut off. By shutting the clocks OFF to synchronous circuits, signals, including the clock signal, do not change state. In which case transistors are not required to charge or discharge capacitance associated with the signal lines and therefore power is conserved. However, because the clocks are shut OFF throughout entire functional blocks, the prior art processor has to wait until all functions are completed within such blocks. This causes the prior art processor to rarely shut OFF clocks to the functional blocks such that little power is conserved over time.

It is desirable to overcome these and other limitations of the prior art processors.

SUMMARY OF THE INVENTION

The present invention includes a method, apparatus and system as described in the claims.

Briefly in one embodiment, a microprocessor includes an instruction decoder of the present invention to decode multiple threads of instructions. The instruction decoder has an instruction decode pipeline. The instruction decode pipeline decodes each input instruction associated with each thread. The instruction decode pipeline additionally maintains a thread identification and a valid indicator in parallel with each instruction being decoded in the instruction decode pipeline.

Other embodiments are shown, described and claimed herein.

BRIEF DESCRIPTION OF THE DRAWINGS

FIG. 7 illustrates control algorithm equations for control logic of the present invention.

FIG. 11A illustrates a clock timing diagram for a first example of an opportunistic powerdown which can be performed by the instruction decoder of the present invention.

DETAILED DESCRIPTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

This invention provides an algorithm to clock, clear and stall a multi-threaded pipelined instruction decoder of a multi-threaded system to maximize performance and minimize power. A thread is one process of a piece of software that can be executed. Software compilers can compile a portion of a software program and split it into multiple parallel streams of executable code or can execute multiple different programs concurrently. Each of the multiple parallel streams of executable code is a thread. Multiple threads can be executed in parallel to provide multitasking or to increase performance. The present invention provides the instruction decode pipeline and a shadow pipeline of instruction thread-identification (thread ID) and instruction-valid bits which shadows the instruction decode pipeline. The thread-ID and valid bits are used to control the clear, clock, and stalls on a per pipestage basis. Instructions associated with one thread can be cleared or, in some cases, stalled without impacting instructions of another thread in the decode pipeline. In the present invention, pipestages are clocked only when a valid instruction is ready to advance so that power consumption and stalling is minimized. A valid instruction is an instruction determined to be executable by an execution unit. An invalid instruction is an instruction determined to not be executable, or an instruction that has faulted, or has an exception condition that requires that it not be executed.

Figure 1:
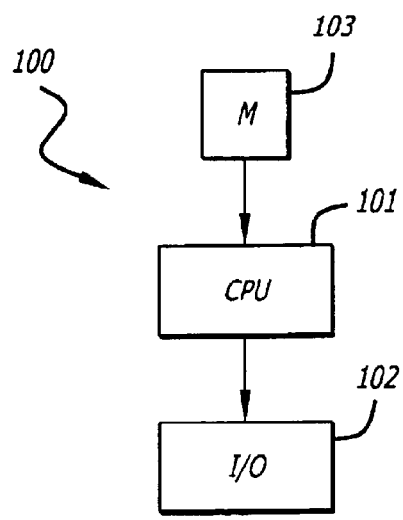
FIG. 1 illustrates a block diagram of a typical computer in which the present invention is utilized.

Referring now to FIG. 1, a block diagram of a typical computer 100 in which the present invention is utilized is illustrated. The computer 100 includes a central processing unit (CPU) 101, input/output peripherals 102 such as keyboard, modem, printer, external storage devices and the like and monitoring devices 103 such as a CRT or graphics display. The monitoring devices 103 provide computer information in a human intelligible format such as visual or audio formats.

Figure 2:
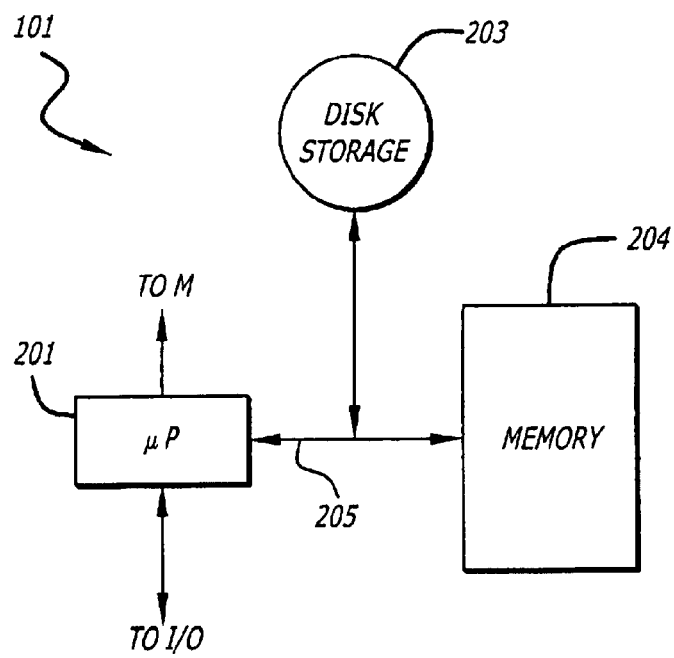
FIG. 2 illustrates a block diagram of a typical central processing unit in which the present invention is utilized.

Referring now to FIG. 2, a block diagram of a typical central processing unit 101 in which the present invention is utilized is illustrated. The central processing unit 101 includes a microprocessor 201 including the present invention, a disk storage device 203, and a memory 204 for storing program instructions coupled together. Disk storage device 203 may be a floppy disk, zip disk, DVD disk, hard disk, rewritable optical disk, flash memory or other non-volatile storage device. The microprocessor 201 and the disk storage device 203 can both read and write information into memory 204 over the memory bus 205. Thus, both the microprocessor 201 and the disk storage device 203 can alter memory locations within memory 204 during program execution. In order for the disk storage device 203 to do this directly, it includes a disk controller with direct memory access which can perform stores into memory and thereby modify code. Because the controller can directly access the memory it is an example of a Direct Memory Access (DMA) agent. Other devices having direct access to store information into memory are also DMA agents. Memory 204 is typically dynamic random access memory (DRAM) but may be other types of rewritable storage. Memory may also be referred to herein as program memory because it is utilized to store program instructions. Upon initial execution of a program stored in the disk storage 203 or stored in some other source such as I/O devices 102, the microprocessor 201 reads the program instructions stored in the disk storage 203 or other source and writes them into memory 204. One or more pages or fractions thereof of the program instructions stored within memory 204 are read (i.e. "fetched") by the microprocessor 201, preliminary decoded, and stored into an instruction cache (not shown in FIG. 2) for execution. Some of the program instructions stored in the instruction cache may be read into an instruction pipeline (not shown in FIG. 2) for execution by the microprocessor 201.

Figure 3:
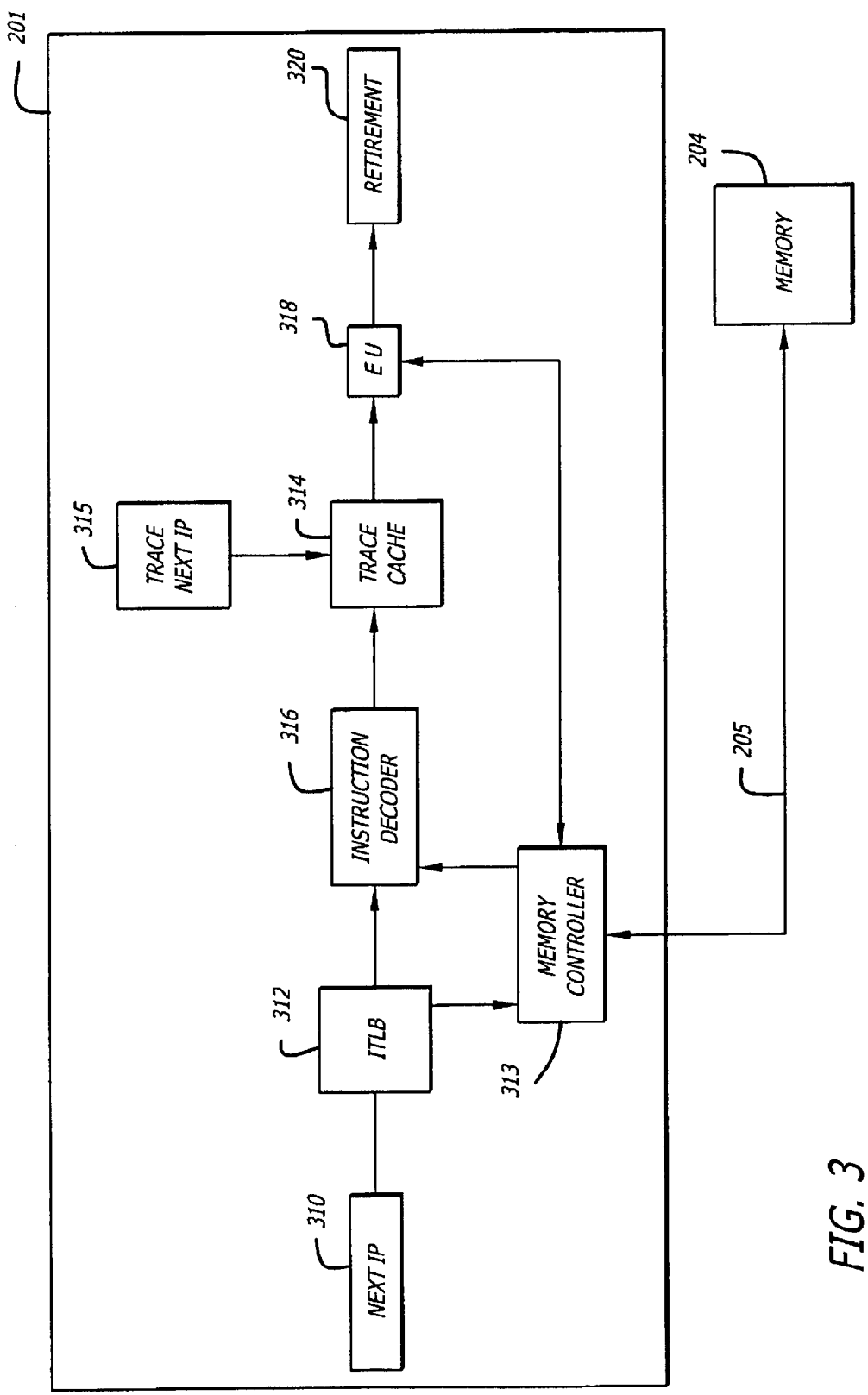
FIG. 3 illustrates a block diagram of a microprocessor including the multi-thread pipelined instruction decoder of the present invention.

Referring now to FIG. 3, a block diagram of the microprocessor 201 is illustrated coupled to memory 204 through the memory bus 205. Microprocessor 201 includes a next instruction processor (IP) 310, an instruction translation lookaside buffer (ITLB) 312, a memory controller 313, a trace instruction cache 314, a trace next instruction processor (IP) 315, an instruction decoder 316, an execution unit 318, and a retirement unit 320. The instruction storage elements within the instruction decoder 316, the trace cache 314, execution unit 318, the retirement unit 320, and other instruction storage elements are considered to be the instruction pipeline of the microprocessor. The next instruction processor (IP) 310 causes the next set of instructions of a process to be fetched from memory 204, decoded by the instruction decoder 316, and stored into the trace cache 314. Microprocessor 201 is preferably a multi-threaded machine. That is, multiple threads of instructions can be decoded and executed by the microprocessor 201 to support multitasking.

The instruction translation lookaside buffer (ITLB) 312 contains page table address translations from linear to physical addresses into memory 204 in order to facilitate a virtual memory. The page table address translations associate the instructions stored in physical memory 204 to the instructions stored in the trace instruction cache 314. Generally, the ITLB 312 accepts an input linear address and returns a physical address associated with the location of instructions within memory 204.

The trace instruction cache 314 can store multiple sequences or traces of decoded instructions for different programs in order to provide multitasking. In a trace instruction cache only the first instruction of a series of instructions for a program (a "trace") has an address associated with it. A sequence of related instructions stored within the trace instruction cache are oftentimes referred to as a "trace" of instructions. The other instructions that follow the first instruction are simply stored within the cache without an associated external address. The trace instruction cache 314 may include instructions that can be used by the execution unit 318 to execute some function or process. If the function or process requires an instruction not within the instruction cache 314, a miss has occurred and the instruction needs to be fetched from memory 204. Memory controller 313 ordinarily interfaces to the instruction cache 314 in order to store instructions therein. In the case of a miss, memory controller 313 fetches the desired instruction from memory 204 and provides it to the trace instruction cache 314 via the ITLB 312 and instruction decoder 316.

Figure 4:
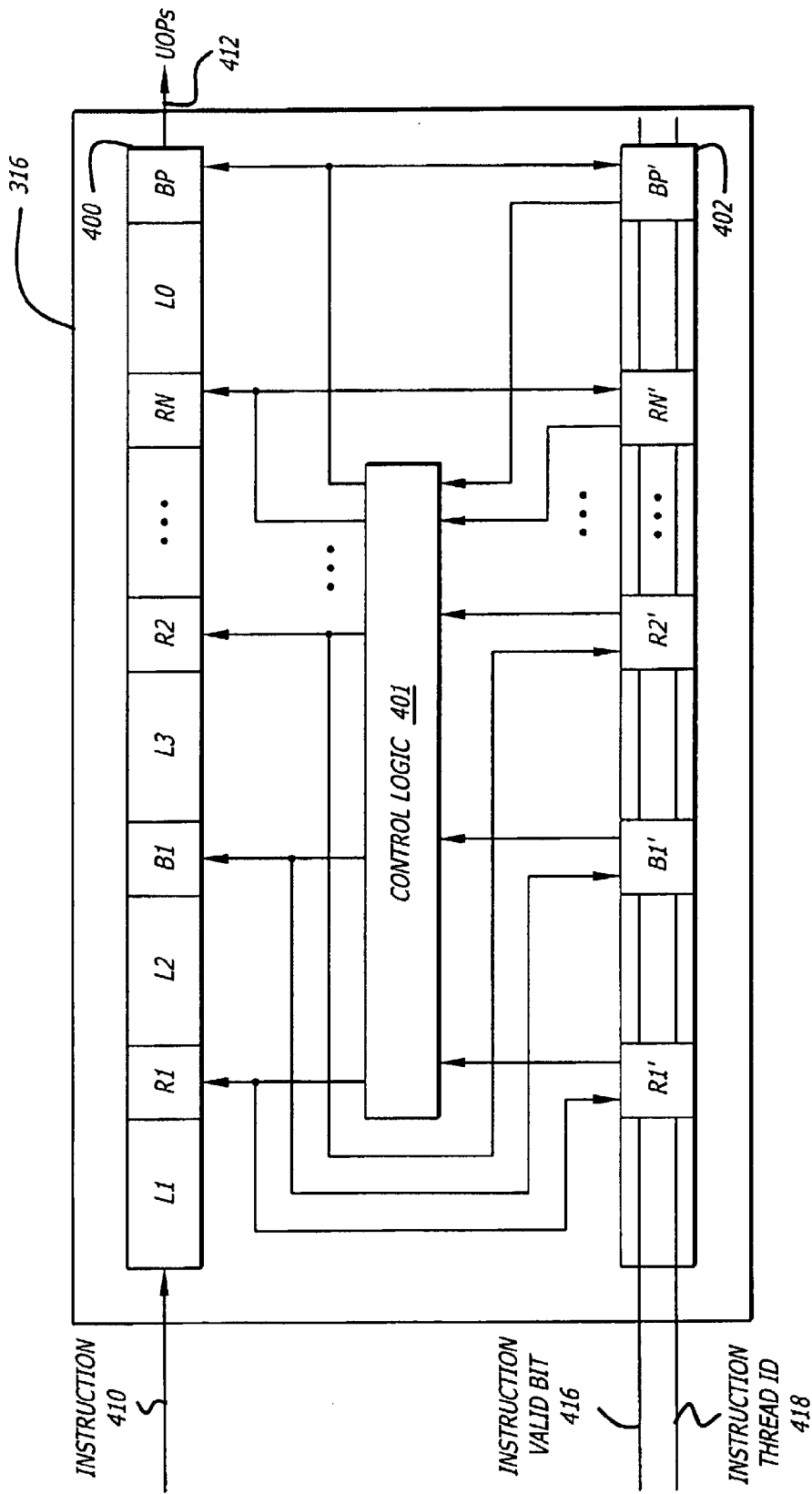
FIG. 4 illustrates a block diagram of the multi-thread pipelined instruction decoder of the present invention.

Referring now to FIG. 4, a block diagram of the multi-thread pipelined instruction decoder 316 of the present invention is illustrated. Instruction decoder 316 includes an instruction decode pipeline 400, control logic 401, and a shadow pipeline 402. The instruction decoder 316 supports multi-threading of instructions. Generally, the instruction decode pipeline 400 of the instruction decoder 316 accepts a block of instructions/operands at its input, separates this block into complete individual instructions/operands, decodes each instruction/operand, and performs the necessary instruction processing needed to form it into a micro-operand (UOP) which is understandable and can be executed by an execution unit, such as execution unit 318. The UOPs output from the instruction decoder 316 are coupled into the trace instruction cache 314 for temporary storage prior to execution. Generally, the instruction decode pipeline 400 includes one or more registers R1–RN, one or more buffers B1–BP, and one or more of logic stages L1–LO interspersed between the registers R1–RN and the buffers B1–BP. Registers R1–RN may consist of D-type flip-flops or transparent latches with appropriate clock signals accordingly. The logic stages L1–LO perform the decoding and necessary instruction processing of operands to form UOPs. While buffer BP is shown in FIG. 4 as being associated with the instruction decode pipeline 400, it may instead be considered part of an instruction cache.

Associated with an instruction input into the instruction decode pipeline 400 are an instruction thread-ID and an instruction valid bit. The shadow pipeline 402 includes a pipe for the instruction thread-ID to support multi-threading and a pipe for the instruction valid bit. In the preferred embodiment, the instruction thread-ID is a single bit or token representing a different instruction thread from the thread before and the thread behind in the instruction decode pipeline. In the preferred embodiment, a single bit or token refers to a Thread Identification zero (Id0) and Thread Identification one (Id1). Multiple bits may be used to provide a more sophisticated multithread identification to support a more complicated instruction pipeline. The valid bits and the thread identification bits may also be encoded together which in turn merges together the instruction valid bit pipeline with the instruction thread-ID pipeline of the shadow pipeline. The instruction thread-ID and the instruction valid bit flow through the shadow pipeline 402 in parallel with each instruction being decoded through the instruction decode pipeline 400. In order for the shadow pipeline 402 to accomplish this, it mirrors the instruction storage elements (registers, buffers, etc.) of the instruction decode pipeline 400 by including registers R1'–RN' and buffers B1'–BP' for the instruction thread-ID and the instruction valid bit. Registers R1'–RN' and buffers B1'–BP' provide the same storage elements as R1–RN and B1–BP respectively, found in the instruction decode pipeline 400. Registers R1'–RN' and buffers B1'–BP' may consist of D-type flip-flops or transparent latches with appropriate clock signals accordingly to match registers R1–RN. The shadow pipeline 402 does not need the logic stages L1–LO that may alter an instruction from one pipe stage to the next. The instruction thread-ID and the instruction valid bit are passed from one pipe stage to the next by the latches/registers and buffers in parallel with the instruction processing while control logic 401 reads each. Control logic 401 provides clock signals to the registers R1–RN and R1'–RN' and the buffers B1–BP and B1'–BP'. The same clock signal is provided to each instruction storage element (register, buffer etc.) respectively in the instruction decode pipeline 400 and the shadow pipeline 402. Stalls and opportunistic powerdown of the present invention equally effect the clocking of the instruction decode pipeline and the shadow pipeline. While FIG. 4 illustrates the instruction decode pipeline 400 separated from the shadow pipeline for clarity, they may be integrated as one pipeline clocked by the same clock signals. In this case, the instruction valid bit and instruction thread-ID are kept together in parallel with the instruction in one pipeline as the instruction is decoded through each pipestage of the pipeline. The instruction valid bit and instruction thread-ID may be encoded with the instruction in some fashion in order to be kept together during the instruction decoding process.

Using a single bit as the Thread-ID, the present invention supports multi-threading by allowing instructions of different threads to be mixed within the instruction decode pipeline 400 between each pipe stage. Using multiple bits as the Thread-ID, the present invention can be altered having increased complexity and added hardware which may be duplicative in order to support more than two threads in each pipestage of the decode pipeline at the same time. In either case, a single instruction decoder can be used to support multiple threads.

Figure 5:
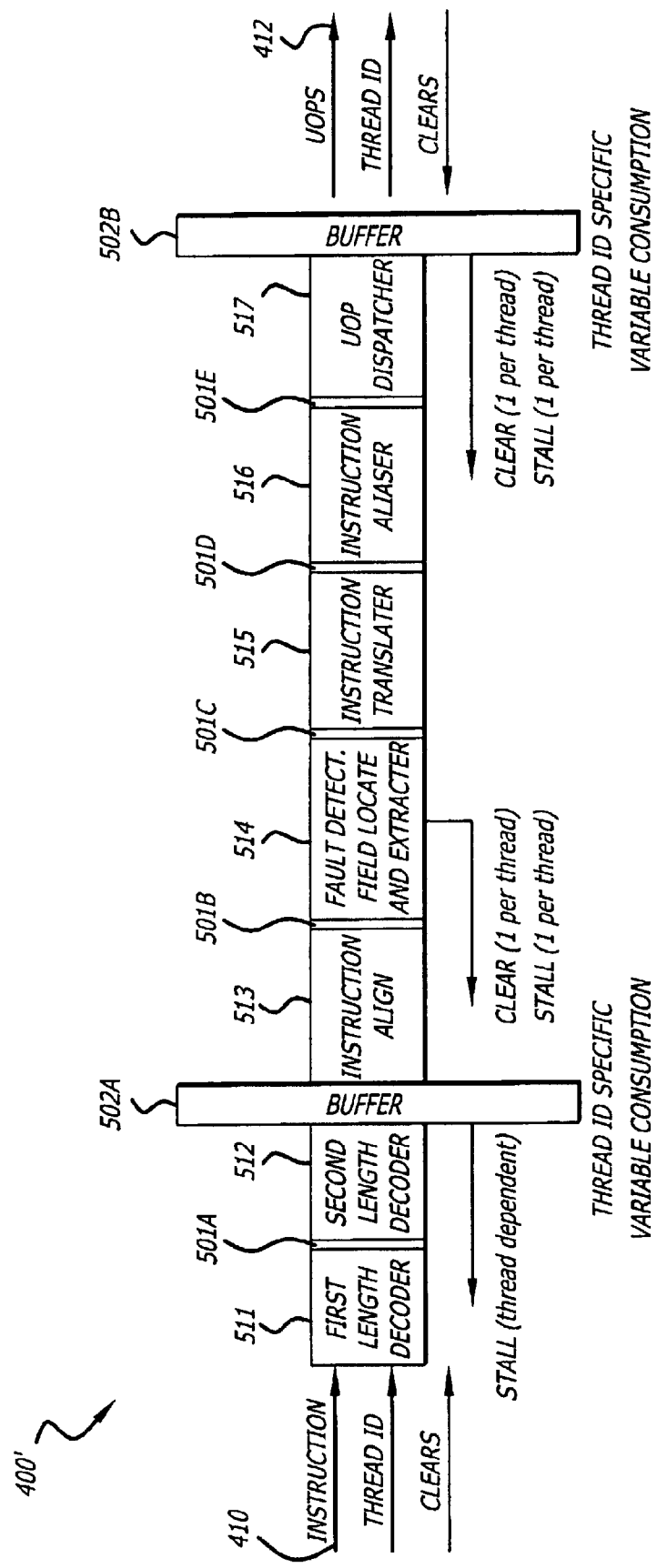
FIG. 5 illustrates a block diagram of the instruction decode pipeline of the present invention.

Referring now to FIG. 5, a detailed block diagram of the instruction decode pipeline 400' of the embodiment is disclosed. In the preferred embodiment, the set of instructions or operands are mostly Intel X86 instructions which are backward compatible with software in combination with other special instructions or operands supported by advanced Intel microprocessors. In the preferred embodiment, the instructions or operands are INTEL X86 instructions which are backward compatible with software and decoded into UOPs which can be executed by an advanced execution unit, the execution unit 318. The instruction decode pipeline 400' receives these instructions or operands from a buffer (not shown) and converts them into UOPs which can be executed by the execution unit 318. By continuing to decode Intel X86 instructions, microprocessor 201 retains software backward compatibility.

The instruction decode pipeline 400' in the preferred embodiment has seven instruction storage elements that use seven clock cycles for an instruction to be decoded and generate a UOP at the end of the pipeline. However, the instruction decode pipeline 400' can have a different number of storage elements providing a different length, provided that, the shadow pipeline 402 has storage elements that match so that the instruction thread-ID and instruction valid bit are parallel with the instruction as its processed. In the preferred embodiment, the instruction decode pipeline can process multiple threads sequentially with one thread being decoded in a pipe stage at a given time.

The instruction storage elements within the instruction decode pipeline 400' include five registers 501A–505E between logical blocks and two buffers 502A and 502B. Registers 501A–505E may consist of D-type flip-flops or transparent latches with appropriate clock signals accordingly. Buffers 502A and 502B are data buffers for storing a plurality of data bytes In the preferred embodiment, the logical functionality within the instruction decode pipeline 400' includes a first length decoder 511, a second length decoder 512, an instruction aligner 513, a fault/prefix-detector and field-locator/extractor 514, an instruction translator 515, an instruction aliaser 516, and a UOP dispatcher 517.

In the preferred embodiment, buffers 502A and 502B are thread dedicated buffers. Essentially, buffers 502A and 502B form two break points in the instruction decode pipeline 400 because they can output their contents (i.e. empty) at variable rates. Buffer 502A is found between the second length decoder 512 and the instruction aligner 513. Buffer 502B, found at the end of the instruction decode pipeline 400, may be considered to be part of the trace instruction cache 314. However, it is shown as part of the instruction decode pipeline 400 to understand the complete problem the present invention resolves. In the preferred embodiment, the registers 501A–505E are D flip-flops each being clocked in a different cycle than the next.

The input instruction 410 into the instruction decode pipeline 400' can be a very long instruction word (VLIW). The VLIW input instruction 410 is input into the first length decoder 511 and the second length decoder 512, decoded and marked off into the multiple processes or functions (i.e. instructions) and stored into the buffer 502A. In the preferred embodiment, buffer 502A accumulates full or partial variable-length X86 instructions. Buffer 502B, at the output of the instruction decode pipeline 400', is used to accumulate a fixed number of UOPs exiting the instruction decode pipeline 400' before being stored into the trace cache 314. When a buffer becomes full; that is a buffer is unable to accept additional instructions; the instruction decode pipeline 400' needs to stall to prevent instructions from being lost. Each of the buffers 502A and 502B can generate a stall signal with the thread-ID of the stall to stall the instruction decode pipeline 400'.

If necessary, buffer 502B can additionally generate a clear signal with the clearthread ID so as to invalidate instructions within the instruction decode pipeline 400' associated with the clearthread ID. Clear signals with clearthread IDs may also be passed to the instruction decoder externally from prior processing blocks or subsequent processing blocks within the microprocessor. The fault/prefix-detector and field-locator/extractor 514 can also generate clear signals with the clearthread Ids if it determines that an instruction is invalid which can not be executed by the execution unit 118 regardless of the further decoding required. Additionally, the fault/prefix-detector and field-locator/extractor 514 may require additional cycles to make its determination about a given instruction. In which case, the fault/prefix-detector and field-locator/extractor 514 can issue a stall signal with thread-ID of the stall.

Buffer 502A, referred to as a steering buffer, holds the multiple processes or functions (i.e. instructions) of the VLIW input instruction 410 for a given thread having a given thread-ID. In the preferred embodiment, the input instruction 410 into the instruction decode pipeline 400' is provided to buffer 502A in eight byte chunks of instructions. While buffer 502A receives and can hold three eight byte chunks of instructions in three eight byte registers providing twenty-four bytes of information in parallel, one instruction is provided at its output. In the preferred embodiment, buffer 502A outputs complete Intel X86 instructions. Intel X86 instructions that are generated by buffer 502A, can be between one to fifteen bytes long. Because of this variable length in Intel X86 instructions, data can be received at a much different rate by buffer 502A than that being output. Buffer 502A holds the same chunk of instructions in a given 8 byte register until all instructions being serviced by this register are processed. That is, for each 8 byte chunk of instructions written into buffer 502A, it may take 8 cycles to read out one instruction, it may take one cycle to read out one instruction, or the buffer may need to wait to receive another one or more 8 byte chunks of instructions in order to complete one instruction at its output. Therefore, one 8 byte register in buffer 502A may become free in one case while the three 8 byte registers in buffer 502A may all at once free up in another case. The multiple processes or functions (i.e. instructions) of the VLIW input instruction 410 are output by the buffer 502A as instructions 410' in a FIFO manner similar to a shift register. Multiplexers can be used to select the process or function of the plurality of processes or functions stored in the buffer 502A for a given VLIW input instruction 410 so that an actual shift register need not be implemented. The output instructions 410' selected by the multiplexing process is provided to the instruction aligner 513. As the instructions 410' are output for the same thread, the thread-ID is duplicated for each instruction being output until the thread of instructions is completed or cleared from the buffer 502A. Buffer 502A signals a stall with a thread-ID until all the plurality of processes or functions stored in the buffer 502A for a given input instruction 410 and thread have been output to the instruction aligner 513 or invalidated. A stall initiated by buffer 502A, can possibly stall prior pipestages, the first length decoder 511 and the second length decoder 512. A stall initiated by buffer 502A would not stall the subsequent pipestages 513 through 517.

Buffer 502B holds the UOPs dispatched by the UOP dispatcher 517 prior to being stored into the trace instruction cache 314. Because of this, the buffer 502B is often referred to as a trace cache fill buffer and consider to be part of the trace cache 314 and not the instruction decoder 316. If buffer 502B becomes full, a stall can be initiated by buffer 502B. A stall initiated by buffer 502B, can possibly stall one or more of prior pipestages 513 through 517, buffer 502A and prior pipestages 511 and 512.

As previously described, the first length decoder 511 and the second length decoder 512 decode and mark off the instruction 410 into the multiple processes or functions (i.e. instructions contained within the VLIW. Buffer 502A outputs these one or more processes or functions as instructions 410'. The instruction aligner 513 aligns the instruction 410' into proper bit fields for further processing by the instruction decoder. The fault/prefix-detector and field-locator/extractor 514 determines if the decoded instruction can be executed by the execution unit 318. The instruction translator 515 converts X86 instructions into a UOP if possible. The instruction aliaser 516 provides the capability of aliasing an instruction, thereby making the decoding logic simpler. The UOP dispatcher 517 outputs UOPs into buffer 502B. The UOP dispatcher 517 is the final check to determine if a valid instruction is presented to it by the prior instruction pipestage.

Figure 6:
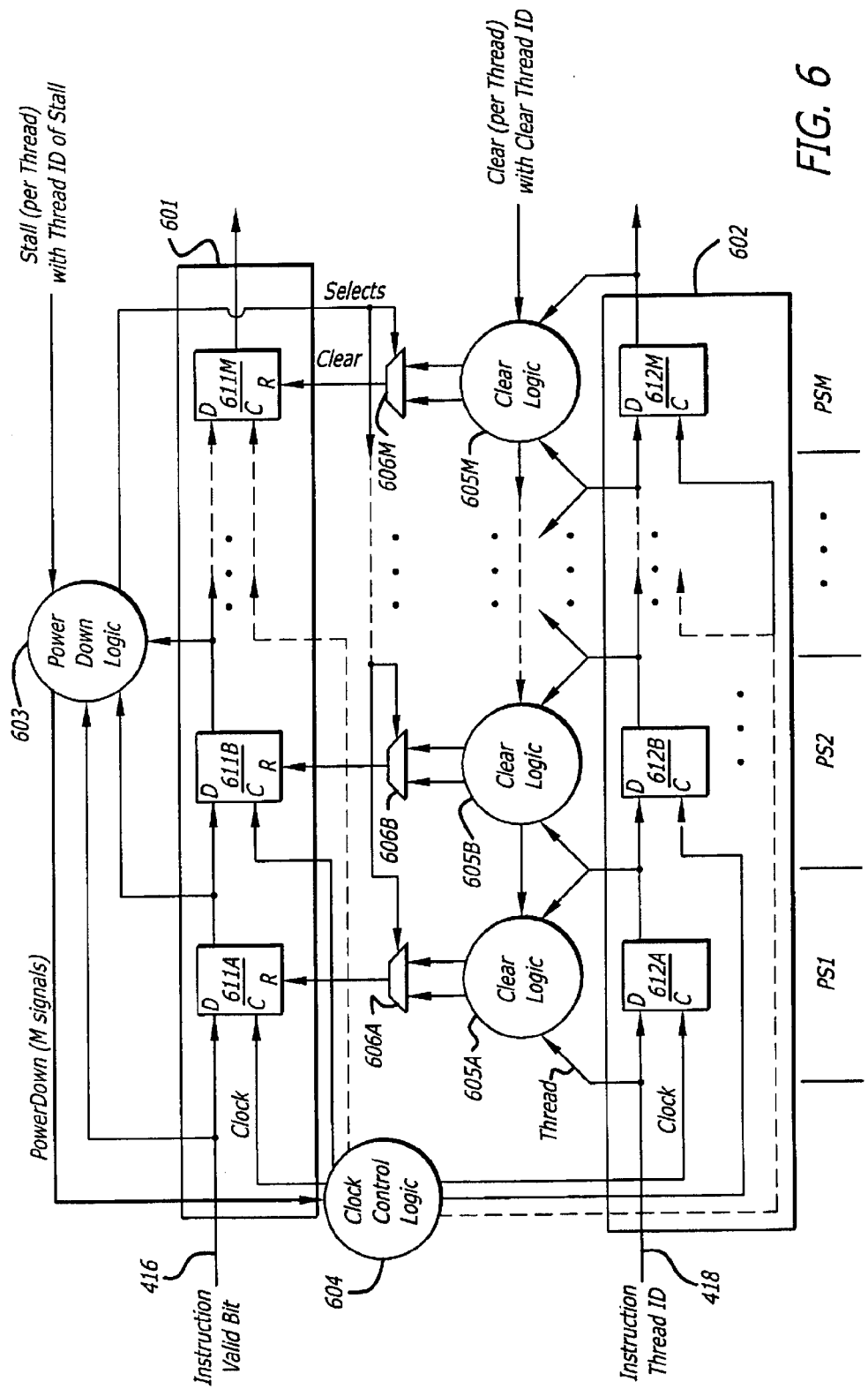
FIG. 6 illustrates a block diagram of the shadow pipeline and control logic for clear, stall and powerdown of a pipestage for the instruction decode pipeline of FIG. 5.

Referring now to FIG. 6, a detailed block diagram of the control logic 401 and shadow pipeline 402 are illustrated. The shadow pipeline 402 includes the instruction valid shadow pipe 601 and the thread identification shadow pipe 602. The control logic 401 illustrated in FIG. 6 includes the power down logic 603, the clock control logic 604, clear logic 605A through 605M-one for each of the M pipe stages, and thread selection multiplexers 606A through 606M-one for each of the M pipe stages. The instruction valid shadow pipe 601 includes M resetable D-type latches/flip-flops 611A through 611M coupled in series together as shown in FIG. 6-one for each pipe stage. The thread identification shadow pipe 602 includes M D-type latches/flip-flops 612A through 612M coupled in series together as shown in FIG. 6-one for each pipe stage. Latches/flip-flops 611A–611M and Latches 612A–612M may consist of D-type flip-flops or transparent latches with appropriate clock signals accordingly to match registers 501A–501E and buffers 502A and 502B. The shadow pipeline 402 provides the means necessary for having multiple threads of instructions within the same instruction decode pipeline 401. D-type latches/flip-flops 611A through 611M and D-type latches/flip-flops 612A through 612M of the shadow pipeline 402, hold the instruction valid bit 416 and instruction thread-ID 418 respectively of each instruction within each pipestage of the instruction decode pipeline 401. In the preferred embodiment, the value of M is seven. To complete decoding of an instruction requires at least M clock cycles.

The control algorithm implemented by the control logic 401 of the present invention to support multi-threading in the pipeline instruction decoder 400' has three main functional parts: (1) Efficient Stalling and Bubble Squeezing, (2) Thread Specific Clearing, and (3) Opportunistic Powerdown. Referring now to FIGS. 6 and 7, FIG. 7 illustrates control algorithm equations executed by the control logic 401 of the present invention illustrated in FIG. 6. The power down logic 603 illustrated in FIG. 6, executes the "Powerdown for any PipeStage X" equation for each pipestage. In order to do so, the powerdown logic 603 has input the instruction valid bit of each pipestage. Additionally, the powerdown logic 603 executes the "Stall for Next to Last PipeStage (NLP)" equation and the "Stall for any other PipeStage (X)" equation illustrated in FIG. 7. In order to do so, the powerdown logic 603 additionally receives a thread stall signal with the thread-ID of the stall to determine if the next to last pipestage of the instruction decode pipeline should be stalled. The powerdown logic 603 processes the stall condition for each pipestage by ANDing the instruction valid bits of a given pipestage with the instruction valid bits of the subsequent pipestage and further ANDing these results with the determination of whether the next to last pipestage is stalled. The powerdown logic passes the stall condition for each stage to the clock control logic 604. The clock control logic selectively runs and stops the clock to each pipestage in accordance with the equation for "Clock Enable for any PipeStage X" illustrated in FIG. 7. If a given pipestage is not stalled and it is not powerdown, then the given pipestage has its clock enabled so that it can be clocked on the next cycle.

The clear logic 605A through 605M illustrated in FIG. 6 for each pipestage, executes the logical equation "Clear for any PipeStage X" illustrated in FIG. 7. At each pipestage but for the next to last, this equation is evaluated to determine if the instruction in the parallel pipestage of the instruction decode pipeline should be invalidated by clearing or setting the instruction valid bit to indicate an invalid instruction. The Select signals input into the multiplexers 606A through 606M select whether the $Clock_{(X)}$ term or the NOT $Clock_{(X)}$ term of the $Clear_{(X)}$ equation is evaluated to generate the clear signal for each pipestage. The clear signal for each pipestage output from each of the multiplexers 606A through 606M is coupled into the reset terminal of each of the resetable D-type latches/flip-flops 611A through 611M. Upon a clear signal being generated for a given pipestage, the instruction valid bit is set or reset to indicate an invalid instruction within the parallel pipestage of the instruction decode pipeline. Each clear logic 605A through 605M receives as an input the instruction thread-ID of a given pipestage and the instruction thread-ID of the prior pipestage to evaluate the terms of the $Clear_{(X)}$ equation. Additionally, all of the clear logic 605A through 605M receive the clear thread signal with the clearthread-ID.

Examples of the functionality of the Efficient Stalling and Bubble Squeezing, Thread Specific Clearing, and Opportunistic Powerdown algorithms are now described with reference to FIGS. 8–10, 11A and 11B. The illustrations provided in FIGS. 8–10, 11A and 11B are associated with the control of the instruction decode pipeline 400' between buffer 502A and buffer 502B in FIG. 5. Pipestages 513 through 517 are referred to as pipestages PS1 through PS5 in the discussion below but can be generalized to the control of any instruction decode pipeline within an instruction decoder using the algorithms of the present invention.

Efficient Stalling and Bubble Squeezing

Stalling generally occurs when any subsystem in a microprocessor can no longer handle further data from another subsystem. In order to avoid loosing data, the prior microprocessor subsystems need to be stalled. Within an instruction decoder, a stall needs to occur when no further instructions can be decoded by a given pipestage in the instruction decode pipeline. A blocking stall is a stall that stops every pipestage within an instruction decode pipeline regardless of the thread-ID or the validity of the instructions in the pipe. A nonblocking stall is a stall which is thread specific or takes the instruction valid bits into account. The non-blocking stall factors in the thread-ID which is to be stalled and the valid bits of the pipestages. For example, if a stall occurs on a thread-ID of one, and an instruction is executing with a thread-ID of zero, the instruction with a thread-ID of zero would continue to execute and instructions with a thread-ID of zero would continue to be decoded by the instruction decoder until an instruction with a thread-ID of one enters the instruction decode pipeline. Upon an instruction with a thread-ID of one entering the instruction decode pipeline, it is stalled. A blocking stall does not take into consideration the thread-ID of an instruction. Efficient stalling is the algorithm performed by the present invention in the instruction decoder to minimize the impact of any stall.

A bubble is a number of invalid instructions located within the instruction decoder. Usually the bubble is created as a result of an entire thread of instructions mixed amongst other instruction threads in the instruction decode pipeline becoming invalid. An example that would cause this is a misconnected branch. The bubble squeeze algorithm performed by the present invention generally squeezes out the bubbles of invalid instructions in the instruction decode pipeline. The bubble squeeze algorithm is essentially accomplished by continuing to clock pipestages which have their instructions marked as invalid until a valid instruction is received. The clocks to a pipestage containing a valid instruction are temporarily stopped until the reason for the stall is cleared. The invalid instructions are eventually squeezed out by writing valid instructions over the invalid instructions stored in the pipestages. The bubble squeeze algorithm continues to run the instruction decode pipeline to bring instructions of other threads further down the pipeline instead of performing a non-intelligent or blocking stall. Bubble squeezing can provide greater throughput in the instruction decoder.

This algorithm for efficient stalling and bubble squeezing processes the thread specific stalls including those generated by the variable consumption buffers. By using the thread-ID from the thread-ID pipeline and instruction valid bits of the instruction valid pipeline, the algorithm determines if a valid instruction of the thread-ID corresponding to the stall would be presented to the buffer in the next cycle. If so, then the next to last pipestage prior to the buffer is stalled (prevented from issuing any more instructions). The next to last pipestage is used instead of the last pipestage in order to provide a cycle time of evaluation in the preferred embodiment. In alternate embodiments, the last pipestage may be substituted for the next to last pipestage. Any other instruction decode pipestages that do not have a valid instruction are not stalled. Any instruction pipestages after the buffer are also not stalled. This allows instructions in the pipe to advance until the pipe is full, while still stalling the next to last pipestage to prevent an instruction from being lost, increasing overall decode bandwidth. If the instruction data about to enter the buffer is not of the same thread as the stall, then the clocks are kept running. This keeps instructions of another thread from being stalled and allows instructions of the same thread further back in the instruction decode pipeline to advance, thereby further increasing the bandwidth of the instruction decoder.

Figure 8:
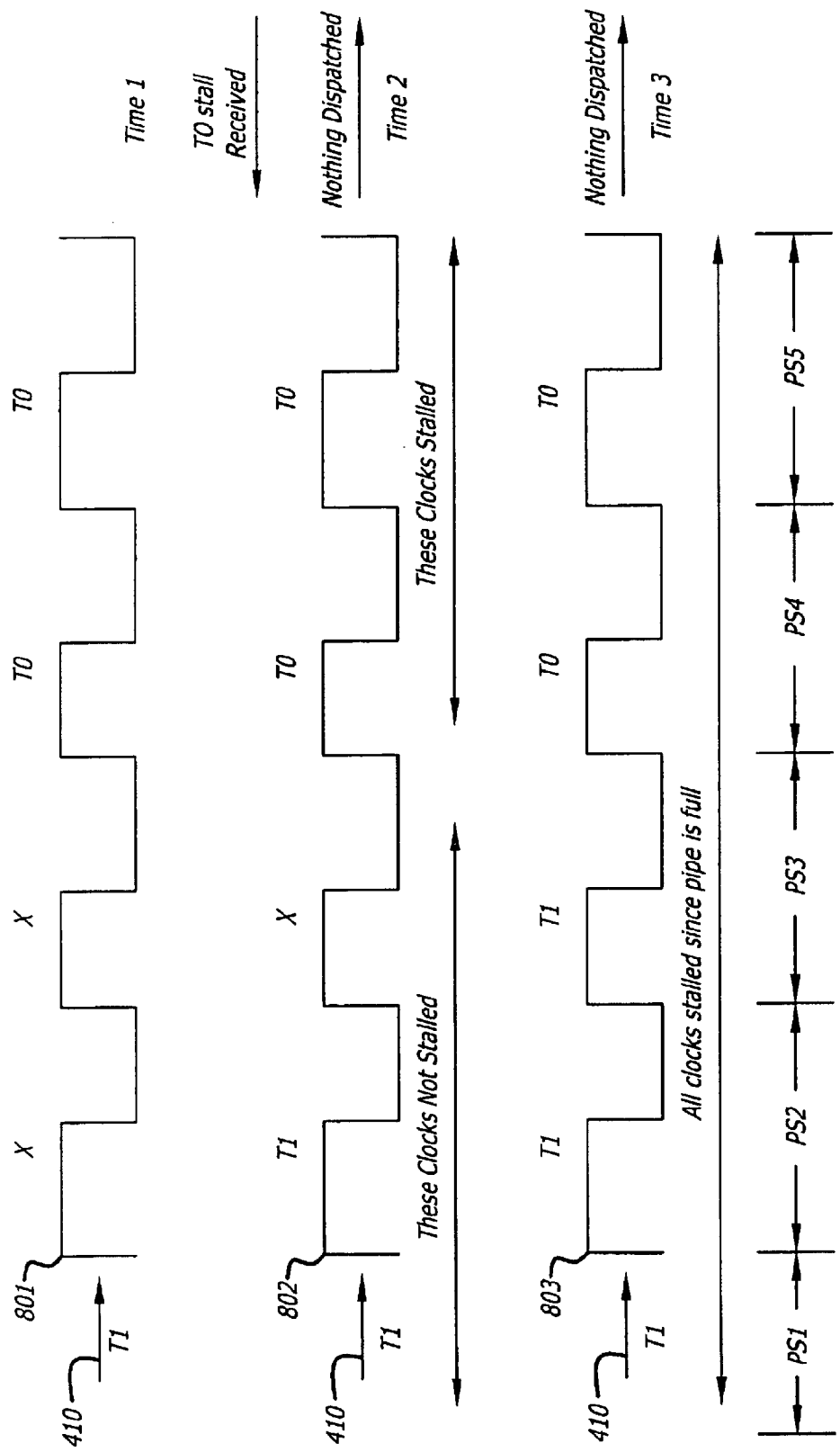
FIG. 8 illustrates a clock timing diagram for an example of a bubble squeeze which can be performed by the instruction decoder of the present invention.

Referring now to FIG. 8, a clock timing diagram for an example of a bubble squeeze which can be performed by the multithread pipelined instruction decoder of the present invention is illustrated. Waveforms 801, 802, and 803 in FIG. 8 are each separated in time by one clock cycle of time. Waveform 801 is a clock diagram with the instruction states as indicated in the pipestages during time 1. Waveform 802 is a clock diagram with the instruction states as indicated in the pipestages during time 2. Waveform 803 is a clock diagram with the states as indicated in the pipestages during time 3. The instruction states for the instructions in the pipestages are illustrated just above each cycle of the waveforms and are a token representing the thread-ID and the instruction valid bit for each pipestage contained with the shadow pipeline. The state X indicates an invalid instruction in a given pipestage. The state T0 (token zero), the instruction being referred to as a T0 instruction, indicates a valid instruction in the pipestage with an instruction thread-ID of zero (thread-ID=0; ID0). The state T1 (token one), the instruction being referred to as a T1 instruction, indicates a valid instruction in the pipestage with an instruction thread-ID of one (thread-ID=1; ID1). Instructions associated with each of the tokens T0 or T1 have the representative state. One or more apostrophes may be used in conjunction with the instruction state to indicate the age of an instruction or the age of invalid condition within a given pipestage.

In FIG. 8, waveform 801 has a bubble of invalid instructions, state X, in its earlier pipestages PS2 and PS3 during time 1. An instruction 410', a T1 instruction associated with the token one (T1) is input into the instruction decode pipeline. Assuming that a T0 thread specific stall occurs from the receipt of a stall signal with a thread-ID of zero and that a clock cycle occurs, waveform 802 is generated. In waveform 802, pipestages PS4 and PS5 have their clocks stalled. The stall condition within pipestage PS4, the next to last stage of the pipeline, can be evaluated from the "Stall for Next to Last PipeStage" equation illustrated in FIG. 7 where NLP is 4 for PS4. The next to last pipestage is used instead of the last pipestage in order to provide a cycle time of evaluation in the preferred embodiment before an instruction is dispatched out of the instruction decoder. In alternate embodiments, the last pipestage may be substituted for the next to last pipestage in the equation for "Stall for Next to Last PipeStage" where NLP is 5 for PS5. From FIG. 7 we have:

$$\text{Stall}_{(NLP)} = \text{Valid Instruction in Pipe}_{(NLP)} \text{ AND } (\text{ThreadID}_{(NLP)} = \text{ThreadID of stall})$$

Because the T0 instruction in pipestage PS4 is a valid instruction and is associated with the T0 thread specific stall (ThreadID=0=ThreadID of stall), a stall condition exist in pipestage PS4. The clocks to pipestage PS4 are thus turned OFF for the next clock cycle to hold the instruction. This can be evaluated from the equation for "Clock Enable for any Pipestage X" illustrated in FIG. 7.

$$\text{Clock}_{(X)} = \text{NOT Stall}_{(X)} \text{ AND NOT Powerdown}_{(X)}$$

Because a stall condition exists in pipestage PS4, its clock enable signal is low to stop the clock for the next clock cycle. The stall condition within pipestage PS5, can be evaluated from the "Stall for any other PipeStage X" equation illustrated in FIG. 7 where X is 5 for PS5.

$$\text{Stall}_{(X)} = \text{Valid Instruction in Pipe}_{(X)} \text{ AND Valid Instruction in Pipe}_{(X+1)} \text{ AND Stall}_{(NLP)}$$

Because the pipestage PS5 has a valid T0 instruction and the prior cycle presumably had a valid instruction dispatched and a Stall(NLP) condition exists; pipestage PS5 has a stall condition as well. The clocks to pipestage PS5 are thus turned OFF for the next clock cycle as well to hold the T0 instruction. Because a stall condition exists in pipestage PS5, its clock enable signal, generated by the equation "Clock Enable for any Pipestage X", is low to stop the clock for the next clock cycle. Therefore, the T0 instructions in pipestages PS4 and PS5 do not move forward in the instruction decode pipeline, but are held in the pipestages and no UOP is dispatched by the UOP dispatcher 517. However, T1 instructions represented by token T1 being associated with a different thread can move forward in the instruction decode pipeline. The clocks to the pipestages PS1, PS2 and PS3 are not stalled and the T1 instruction in pipestage PS1 is advanced in the instruction decode pipeline to pipestage PS2 in waveform 802 during time 2. A stall condition does not exist for pipestage PS2 during time 2 in waveform 802 because there is an invalid instruction in the subsequent pipestage PS3. As indicated by the waveform 802, the invalid instruction previously found in pipestage PS2 has been overwritten by a T1 instruction. Because the instruction decode pipeline still has an invalid instruction located within it in pipestage PS3, another T1 instruction 410' can be advanced from pipestage PS1 on the next clock cycle. After another clock cycle, waveform 803 is generated. In waveform 803 the T1 instruction previously in the pipestage PS2, is advanced into the next pipestage PS3 while a T1 instruction from pipestage PS1 is advanced into pipestage PS2. Thus the second invalid instruction previously located in the pipestage PS3 of waveform 802 is squeezed out of the instruction decode pipeline. In waveform 803 because the instruction decode pipeline is now full, the entire instruction decode pipeline is stalled and no further clocking of any pipestage can occur until the T0 thread specific stall is cleared to allow UOPs to be dispatched. In this manner a bubble of invalid instructions can be squeezed out of the instruction decoder.

Figure 9:
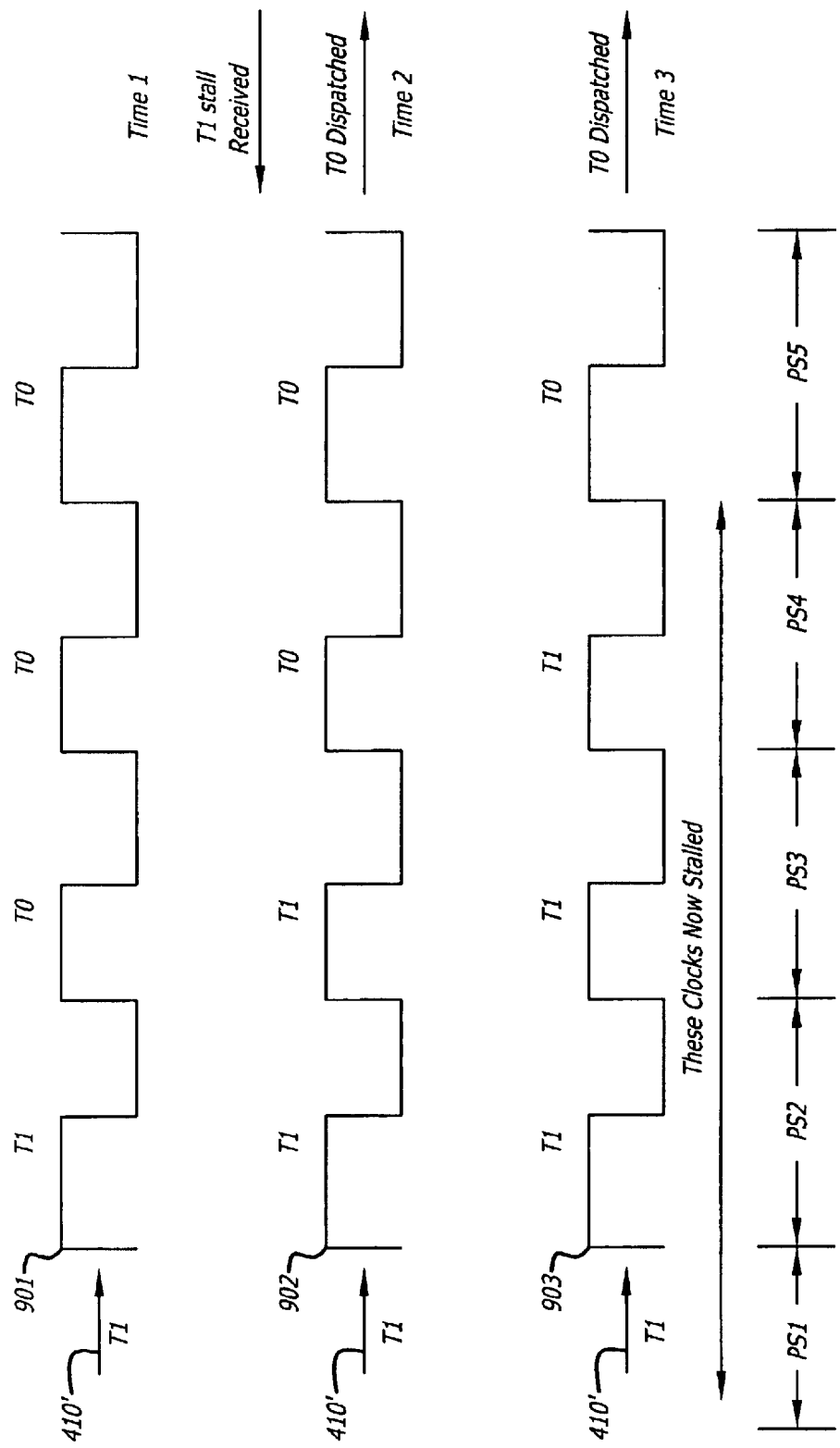
FIG. 9 illustrates a clock timing diagram for an example of a non-blocking stall which can be performed by the instruction decoder of the present invention.

Referring now to FIG. 9, a clock timing diagram of an example of a non-blocking stall or efficient stall which can be performed by the instruction decoder of the present invention is illustrated. Waveforms 901, 902, and 903 in FIG. 9 are each separated in time by one clock cycle of time. Waveform 901, 902, and 903 are clock diagrams illustrating the instruction states as indicated above the waveforms in the pipestages during time 1, time 2 and time 3 respectively. The instruction states have the same meanings as previously discussed with reference to FIG. 8.

In FIG. 9, the pipestages in the instruction decode pipeline contain T1 instructions from a thread having a thread-ID of one and T0 instructions from a thread having a thread-ID of zero each being indicated by the tokens of above the waveform 901. In waveform 901, a T1 instruction 410' is incident within pipestage PS1 and another T1 instruction is stored in pipestage PS2 in a decoded form. In waveform 901, T0 instructions are stored in pipestages PS3, PS4, and PS5. After another clock cycle, waveform 902 is generated. Each instruction within the pipestages illustrated by waveform 901 has advanced in the instruction decode pipeline. The T0 instruction previously in the pipestage PS5 of waveform 901 is dispatched by pipestage PS5 during time 2. In waveform 902, a T1 instruction 410' is incident within pipestage PS1 and other T1 instructions are stored in pipestages PS2 and PS3 in a decoded form. In waveform 902, T0 instructions are now stored in pipestages PS4 and PS5. Now assuming that a T1 thread specific stall signal is received by the control logic 401, the next clock cycle generates the waveform 903. In waveform 903, one T0 instruction is stored in pipestage PS5 while another T0 instruction is dispatched. In waveform 903, T1 instructions now occupy the pipestages S1, PS2, PS3, and PS4. Because the instructions in the later pipestages of the instruction decode pipeline are T0 instructions and not T1 instructions, the pipeline can be continued to be clocked until a T1 instruction associated with the T1 thread specific stall reaches the next to last pipestage, PS4. When a T1 instruction reaches the next to last pipestage PS4, the conditions for a stall from the equation for the "Stall for Next to Last Pipestage (NLP)" is satisfied. The T0 instruction occupying PS5 is dispatched to the trace cache. In this manner, stalls can be intelligently handled by the instruction decoder.

Thread Specific Clearing

Instructions may require clearing for a number of reasons. Clearing essentially invalidates invalid instructions so that they can be disregarded and overwritten with valid instructions. Clear signals may be issued to invalidate entire threads of instructions associated with a specific thread-ID. These type of clears are referred to as thread specific clears. Thread specific clears to invalidate instructions can be generated by a number of functional blocks within a microprocessor including a memory subsystem (e.g. self modifying code), the instruction decode pipeline itself (e.g.: Branch Address Calculator or X86 Decode Faults), the retirement unit 320 or other back-end functional blocks of the microprocessor. The thread specific clearing algorithm of the present invention clears only those instructions as necessary from the instruction decode pipeline leaving valid instructions therein for continued decoding and execution by the microprocessor. The thread specific clearing algorithm of the present invention uses the instruction valid bits 416 and instruction thread identification 418 information of the shadow pipeline 402 to issue clear signals only to those pipestages containing an instruction of the corresponding thread being cleared. These clears will invalidate the corresponding valid bit of those instructions corresponding to the thread being invalidated contained within each pipe stage of the instruction decode pipeline. A thread specific clear of the instruction decode pipeline allows the removal of one thread of instructions while leaving other threads of instructions intact. The intact instructions have the ability to be advanced in the instruction decode pipeline over those which have been removed by being invalidated. Thread specific clearing can be preformed during a stall to eliminate the stall condition if the instruction causing the stall is cleared. In a cycle based processor design, the pipestages of the instruction decode pipeline are analyzed to determine if they are stalled or not to perform the thread specific clearing to eliminate the stall condition. The thread specific clearing essentially removes a thread that is getting in the way of another thread in the instruction decode pipeline. This solves the problem referred to as a deadlock condition which occurs in multithreaded machines sharing the same hardware. A deadlock condition for example is where an instruction of thread-ID 0 is stalled waiting for instruction of thread-ID 1 to do something but instruction of thread-ID 0 is blocking instruction of thread-ID 1 from using a resource such as the trace cache. If the entire pipeline were to be cleared under this condition there is no assurance that the same condition would not recur. The thread specific clearing that clears only those pipestages as necessary enables having multiple threads share a single hardware resource. Additionally, there is an all thread clear signal which affects all threads by effectively removing all valid instructions from the pipeline.

Figure 10:
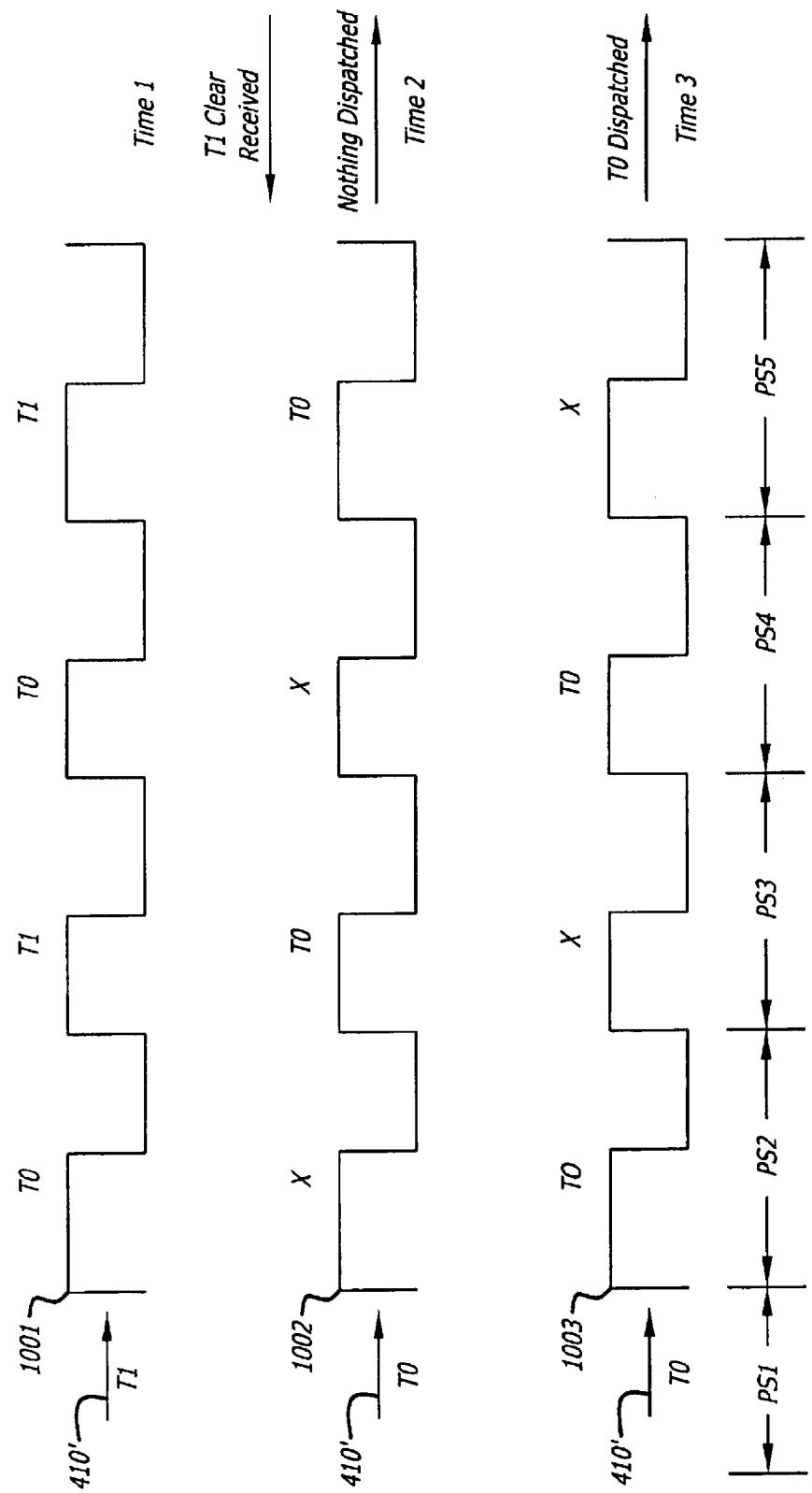
FIG. 10 illustrates a clock timing diagram for an example of a thread specific clear which can be performed by the instruction decoder of the present invention.

Referring now to FIG. 10, a clock timing diagram of an example of a thread specific clear which can be performed by the instruction decoder of the present invention is illustrated. Waveforms 1001, 1002, and 1003 are each separated in time by one clock cycle of time. Waveforms 1001, 1002, and 1003 are clock diagrams illustrating the instruction states of the pipestages during time 1, time 2 and time 3 respectively. The states of the pipestages are illustrated just above each cycle of the waveforms and have the same meanings as previously discussed with reference to FIG. 8.

In FIG. 10, waveform 1001 has T1 instructions and T0 instructions from two threads within its pipestages as indicated by the token one (T1) state and the token zero (T0) state. In waveform 1001, T0 instructions are in pipestages PS2 and PS4. T1 instructions are in pipestages PS3 and PS5 at time 1. A new instruction 410', a T1 instruction, is input into the first pipestage PS1 of the instruction decode pipeline. In waveform 1001, all instructions in the pipestages PS1–PS5 of the instruction decode pipeline are valid during time 1. Now assume that a T1 thread specific clear has been received. T1 instructions, instructions which are associated with the thread represented by token (T1), are invalidated in the pipestages of the instruction decode pipeline. Instructions are invalidated by setting or clearing the instruction valid bit in the appropriate pipestages of the shadow pipeline. In waveform 1002, the pipestages have all been clocked to shift instructions to the next pipestage in progression from that of waveform 1001. The instructions in the pipestages in PS2 and PS4 which would have otherwise held T1 instructions are now in invalid states as indicated by the X. This can be evaluated by analyzing the equation of "Clear for any PipeStage X" which is illustrated in FIG. 7.

$$\text{Clear}_{(X)} = \{\text{Clock}_{(X)} \text{ AND } [(\text{ClearThread}_{(ID0)} \text{ AND } (\text{ThreadID}_{(X-1)} = \text{ID1})) \text{ OR } (\text{ClearThread}_{(ID1)} \text{ AND } (\text{ThreadID}_{(X-1)} = \text{ID1}))]\}$$

OR $$\{\text{NOT Clock}_{(X)} \text{ AND } [(\text{ClearThread}_{(ID0)} \text{ AND } (\text{ThreadID}_{(X)} = \text{ID0})) \text{ OR } (\text{ClearThread}_{(ID1)} \text{ AND } (\text{ThreadID}_{(X)} = \text{ID1}))]\}$$

This equation has two terms one term with $\text{Clock}_{(X)}$ and another term with NOT $\text{Clock}_{(X)}$. As a result of the clocks not being stalled in this case, the term with $\text{Clock}_{(X)}$ of the two terms is the term that may cause a clear. If a pipestage were stalled, the term with NOT $\text{Clock}_{(X)}$ of the two would be relevant to evaluate to determine if a clear condition should occur. In this equation, ClearThread(ID0) is a thread specific clear for thread-ID of zero. ClearThread(ID1) is a thread specific clear for thread-ID of one. Pipestage PS2 is cleared because PS1 in time 1 of waveform 1001 is a T1 instruction and a T1 thread specific clear was received such that on the next clock cycle PS2 stage is cleared and its instruction invalidated to an X. That is ClearThread(ID1) was the T1 thread specific clear and the Thread-ID of PS1 in time 1 is one such that a clear condition exists resulting in PS2 being cleared on the next clock cycle. The clear of pipestage PS4 during time 2 can be similarly explained with reference to the prior value held in pipestage PS3 during time 1.

In waveform 1002, pipestages PS3 and PS5 hold T0 instructions. Because a T1 thread specific clear occurred, the instruction in the pipestage PS5 during time 1, being a T1 instruction, was cleared and thus nothing was dispatched by the UOP dispatcher 517 during time 2. After another clock cycle, waveform 1003 is generated. In waveform 1003, the pipestages have all been clocked to shift instructions to the next pipestage in progression from that of waveform 1002. A new thread of instructions associated with token zero (T0), T0 instructions, are now input into the first pipestage, PS1. The invalid instructions indicated by the X have shifted into pipestages PS3 and PS5. T0 instructions are held in pipestages PS2 and PS4 while a T0 instruction is dispatched by the UOP dispatcher 517 during time 3. In this manner, thread specific clearing of the pipestages of the instruction decoder occur. Instructions related to other threads can remain in the pipestages and can be further decoded without any delay.

Opportunistic Powerdown

The opportunistic powerdown algorithm in one case stops the clock to an entire pipestage of circuitry (per pipe) in order to conserve power as opposed to just a functional block. In another case, the opportunistic powerdown algorithm can stop the clock to any pipestages of circuitry holding the same thread of instructions (per thread) if that thread was cleared in order to conserve power. In yet another case, the opportunistic powerdown algorithm can stop the clock to the entire instruction decoder and any prior circuitry if there is no valid instruction within the instruction decoder or in prior circuitry providing instructions (per pipeline) to the instruction decoder. These conditions can be detected by clock control circuitry to determine when to disable the clock enable signal to turn OFF the clock to one or more pipestages of circuitry. Because the powering down is transparent to a user, there being no performance or functional penalty, the algorithm is opportunistic. Power conservation is the only noticeable effect to a user from the opportunistic powerdown algorithm.

The opportunistic powerdown algorithm of the present invention uses the instruction valid pipeline to decide whether to clock a particular pipestage or not. If a valid instruction immediately preceding a pipestage is about to advance into it, then that pipestage receiving the valid instruction is clocked. If there is no valid instruction waiting, the immediately preceding instruction being invalid, the clocks to the pipestage that would otherwise receive the invalid instruction are turned OFF (i.e. clocks stopped) to conserve power. Similarly, by checking the instruction validity information in each stage of the shadow pipeline, we can detect when each stage of the entire instruction pipeline is not in use, and signal to clock control logic to turn off the clock globally to the instruction decode pipeline or to portions thereof. By stopping the clocks in this fashion, power consumption of the instruction decoder can be reduced.

Figure 11B:
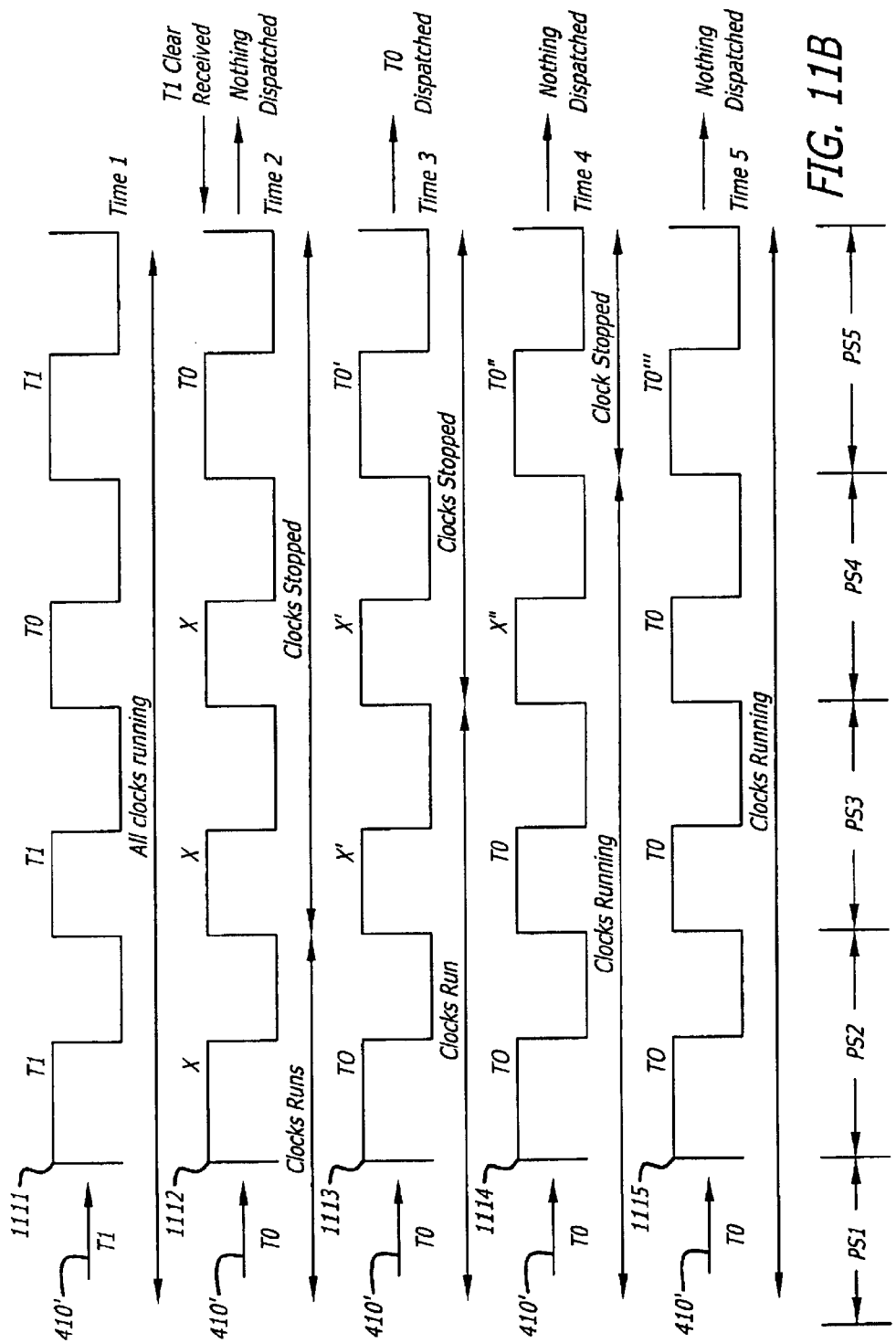
FIG. 11B illustrates a clock timing diagram for a second example of an opportunistic powerdown which can be performed by the instruction decoder of the present invention.

Referring now to FIG. 11A and FIG. 11B, clock timing diagram of examples of opportunistic powerdown which can be performed by the instruction decoder of the present invention are illustrated. Waveforms 1101, 1102, and 1103 are clock diagrams illustrating the states where indicated of the pipestages during time 1, time 2 and time 3 respectively, each being separated by one clock cycle of time. Waveforms 1111, 1112, 1113, 1114, and 1115 are clock diagrams illustrating the states where indicated of the pipestages during time 1, time 2, time 3, time 4, and time 5 respectively, each being separated by one clock cycle of time. The states of the pipestages are illustrated just above each cycle of the waveforms and have the same meanings as previously discussed with reference to FIG. 8.

In FIG. 11A, waveform 1101 has instructions from two threads within its pipestages as indicated by the token one (T1) state and the token zero (T0) state. In waveform 1101, T0 instructions, instructions of a thread associated with the token zero (T0), are in pipestages PS2 and PS4. T1 instructions, instructions of a thread associated with the token one (T1), are in pipestages PS3 and PS5. A new instruction 410', a T1 instruction, is input into pipestage PS1. Because all instructions are valid in the instruction decode pipeline illustrated by waveform 1101 during time 1, all clocks to each pipestage will run to generate the next cycle. Now assume that a T1 thread specific clear has been received such that T1 instructions are to be invalidated in pipestages that are to receive these instructions on the next cycle.

After another clock cycle has occurred, waveform 1102 is formed at time 2. In waveform 1102, the pipestages have all been clocked from waveform 1101 to shift instructions to the next pipestage in progression. Because of the T1 thread specific clear, pipestages PS2 and PS4, which would have otherwise held T1 instructions, are now holding invalid instructions as indicated by the invalid states, X. Because a T1 thread specific clear occurred, the last instruction in the pipeline indicated in waveform 1101, being a T1 instruction, was cleared and thus nothing was dispatched by the UOP dispatcher 517 during time 2.

In order for the opportunistic powerdown algorithm in the instruction decoder to function, one or more pipestages need to contain invalid instructions. A given pipestage [$Pipe_{(X)}$] can be powerdown if the instruction in the immediately preceding pipestage [$Pipe_{(X-1)}$] contains an invalid instruction. This is clear from the equation for Powerdown for any PipeStage X illustrated in FIG. 7.

$$Powerdown_{(X)} = \text{NOT Valid Instruction in } Pipe_{(X-1)}$$

A given pipestage is powerdown by turning its clocks OFF. With an invalid instruction behind the given pipestage, clocking the pipestage on the next cycle to receive invalid data would consume power unnecessarily. In waveform 1102, pipestages PS3 and PS5 have their clocks stopped for the next cycle because pipestages PS2 and PS4 respectively have invalid instructions as indicated by the X. However, the pipestage [$Pipe_{(X+1)}$] immediately proceeding a clocked stop pipestage has its clocks turned ON, if a stall condition does not exist, in order to advance the valid instruction. In waveform 1102, pipestage PS4 has its clock running for the next cycle and the buffer 502B will receive a dispatch output on the next cycle. This can be seen from the equation for Clock Enable for any PipeStage X illustrated in FIG. 7.

$$Clock_{(X)} = \text{NOT } Stall_{(X)} \text{ AND NOT } Powerdown_{(X)}$$

Pipestages with invalid instructions, preceding the given pipestage with the valid instruction, are continuously clocked until a valid instruction is contained therein.

In waveform 1102, the clock to pipestages PS2 and PS4 will run on the next cycle because there is an invalid instruction in these pipe stages as indicated by the X status. In this manner, the instruction decoder continues to decode until valid instructions are decoded into these pipe stages. The clock to pipestages PS3 and PS5 have their clocks stopped because they hold valid instructions as indicated by the token T0.

After another clock cycle has occurred, waveform 1103 is formed at time 3. In waveform 1103, the clock to pipestages PS3 and PS5 will run to generate the next cycle because there is an old instruction in these pipe stages as indicated by the T0' status because the T0 instruction has progressed to the next stage. An old instruction is indicated by one or more apostrophe symbols depending upon how may cycles it has remained in the same pipestage. An old instruction is similar to an invalid instruction in that it can be overwritten or discarded. This is different from a stalled instruction which is still valid and cannot be overwritten. In this manner, the instruction decoder continues to decode until valid instructions are decoded in the pipe. From waveform 1103, the clock to pipestages PS2 and PS4 have their clocks stopped for the next cycle because they hold valid instructions as indicated by the token T0. Because pipestage PS5 held a valid T0 instruction in the prior clock cycle as indicated by waveform 1102, the T0 instruction is dispatched by the UOP dispatcher 517. Input instruction 410' being input into the instruction decode pipeline of pipestage PS1 is invalid as indicated by the X in waveform. Therefore, the clock to the first pipestage PS1 are stopped to avoid reading the invalid instruction on the next clock cycle.

Referring now to FIG. 11B, a clock timing diagram of the second example of opportunistic powerdown is illustrated. Waveform 1111 has instructions from two threads within its pipestages as indicated by the token one (T1) state and the token zero (T0) state. In waveform 1111, T0 instructions, instructions of a thread associated with the token zero (T0), is in pipestage PS4. T1 instructions, instructions of a thread associated with the token one (T1), are in pipestages PS2, PS3 and PS5. A new instruction 410', a T1 instruction, is input into pipestage PS1. Because all instructions are valid in the instruction decode pipeline illustrated by waveform 1111 during time 1, all clocks to each pipestage will run to generate the next cycle. Now assume that a T1 thread specific clear has been received such that T1 instructions are to be invalidated in pipestages that are to receive these instructions on the next cycle.

After another clock cycle has occurred, waveform 1112 is formed at time 2. In waveform 1112, the pipestages have all been clocked from waveform 1111 to shift instructions to the next pipestage in progression. Because of the T1 thread specific clear, pipestages PS2, PS3, and PS4, which would have otherwise held T1 instructions, are now holding invalid instructions as indicated by the invalid states, X. Because a T1 thread specific clear occurred, the last instruction in the pipeline indicated in waveform 1111, being a T1 instruction, was cleared and thus nothing was dispatched by the UOP dispatcher 517 during time 2. In waveform 1112, pipestages PS3, PS4 and PS5 have their clocks stopped for the next cycle because pipestages PS2, PS3 and PS4 respectively have invalid instructions as indicated by the X status. Pipestage PS2 has its clock running in order to receive the valid T0 instruction being input into the first pipe stage PS1 in waveform 1112. Because the T0 instruction in pipestage PS5 is valid, the buffer 502B will receive a dispatch output on the next cycle.

After another clock cycle has occurred, waveform 1113 is formed at time 3. In waveform 1113, the clock to pipestages PS3 will run to generate the next cycle because there is an old invalidated instruction in pipestage PS3 as indicated by the X' status to cause the T0 instruction in pipestage PS2 to progress to the next stage. In waveform 1113, the clock to pipestages PS2 will run to generate the next cycle to receive the new T0 instruction which is currently input into the first pipestage PS1 from the instruction input 410'. The clocks to the pipestages PS4 and PS5 remain stopped due to no valid instruction preceding them. The instruction within pipestage PS4 and PS5 age another cycle to X' and T0' respectively.

After another clock cycle has occurred, waveform 1114 is formed at time 4. In waveform 1114, the clock to pipestage PS4 will run to generate the next cycle because there is an old invalidated instruction in pipestage PS4 as indicated by the X" status to cause the T0 instruction in pipestage PS3 to progress to the next stage. In waveform 1114, the clock to pipestages PS2 and PS3 will run to generate the next cycle to receive the new T0 instruction from the prior pipestage after being input into the first pipestage PS1 from the instruction input 410'. The clock to the pipestage PS5 remains stopped due to no valid instruction preceding it in pipestage PS4. The instruction within pipestage PS5 ages another cycle to T0".

After another clock cycle has occurred, waveform 1115 is formed at time 5. In waveform 1115, the clock to pipestage PS5 will run to generate the next cycle because there is an old instruction in pipestage PS5 as indicated by the T0''' to cause the T0 instruction in pipestage PS4 to progress to the next stage. In waveform 1115, the clock to pipestages PS2, PS3, and PS4 will run to generate the next cycle to receive the new T0 instruction from the prior pipestage after being input into the first pipestage PS1 from the instruction input 410'. In this example, pipestage PS5 was able to have its clocks stopped in an opportunistic powerdown for three cycles. Pipestage PS4 was able to have its clocks stopped in an opportunistic powerdown for two cycles. Pipestage PS3 was able to have its clocks stopped in an opportunistic powerdown for one cycle. In other cases of opportunistic powerdown conditions, more or less power will be conserved.

The algorithms for Efficient Stalling and Bubble Squeezing, Thread Specific Clearing, and Opportunistic Powerdown are inter-related. For example clearing a specific pipestage using a thread specific clear can cause a stall to be eliminated for a given pipestage. Alternatively, a thread specific clear may invalidate instructions in certain pipestages to provide an opportunistic powerdown condition.

The present invention has many advantages over the prior art. One advantage of the present invention is that stalls in the front-end of the processor will occur infrequently. Another advantage of the present invention is that invalid instruction 'bubbles' can be squeezed out from the instruction flow. Another advantage of the present invention is that it can clear instructions of one thread in the instruction decode pipeline while leaving other instruction threads intact. Another advantage of the present invention is that the net decode bandwidth is increased. Another advantage of the present invention is that pipestages within the instruction decode pipeline are only clocked when needed to advance a valid instruction thereby conserving power. Another advantage of the present invention is that multiple threads of instructions share the same instruction decoder to increase decode performance per thread at a low implementation cost.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, the present invention is not limited in its application to only Intel X86 instruction decoding but can be applied to any multi-threaded pipelined instruction decoder. Furthermore, the present invention can be adapted to other functional areas and blocks of a microprocessor that support multi-threading in order to reduce the amount of hardware to support multi-threading, reduce power consumption or reduce the negative effects that stalls have on performance. Additionally, it is possible to implement the present invention or some of its features in hardware, firmware, software or a combination where the software is provided in a processor readable storage medium such as magnetic, optical, or semiconductor storage.

What is claimed is:

1. A pipelined instruction decoder for a multithread processor, the pipelined instruction decoder comprising:

an instruction decode pipeline to decode instructions associated with a plurality of instruction threads, the instruction decode pipeline having a predetermined number of pipe stages;

a valid bit pipeline in parallel with the instruction decode pipeline, the valid bit pipeline having the same predetermined number of pipe stages in parallel with the predetermined number of pipe stages of the instruction decode pipeline, the valid bit pipeline to associate a valid indicator at each pipe stage with each instruction being decoded in the instruction decode pipeline; and a thread identification pipeline in parallel with the instruction decode pipeline and the valid bit pipeline, the thread identification pipeline having the same predetermined number of pipe stages in parallel with the predetermined number of pipe stages of the instruction decode pipeline and the valid bit pipeline, the thread identification pipeline to associate a thread identification at each pipe stage with each instruction being decoded in the instruction decode pipeline.

2. The pipelined instruction decoder of claim 1 further comprising:

a pipeline controller coupled to the instruction decode pipeline, the valid bit pipeline, and the thread identification pipeline, the pipeline controller to separately control the clocking of each pipe stage of the instruction decode pipeline, the valid bit pipeline, and the thread identification pipeline.

3. The pipelined instruction decoder of claim 2 wherein the pipeline controller includes clear logic for each pipe stage, the clear logic to control the invalidation of instructions in each pipe stage of the instruction decode pipeline by setting a valid bit in a respective pipe stage of the valid bit pipeline to indicate an invalid instruction.

4. The pipelined instruction decoder of claim 2 wherein the pipeline controller includes powerdown logic to analyze the valid indicator of each pipe stage to determine if a next pipe stage is to be powerdowned and to determine if a pipe stage is to be stalled; and clock control logic to determine if respective clock signals to a pipe stage of the instruction decode pipeline, the valid bit pipeline, and the thread identification pipeline are to be stopped to conserve power or preserve data during a stall.

5. The pipelined instruction decoder of claim 4 wherein the powerdown logic of the pipeline controller to analyze the valid bit of each pipestage to determine if any pipestage should be stalled, the powerdown logic including an exclusive-OR (XOR) gate to exclusively OR a thread identification of a next to last pipe stage with a thread identification of a stall to determined if they match, and a first AND gate to AND a valid bit of the next to last pipe stage with an output of the XOR gate, in order to determine if a pipe stage prior to the next to last pipe stage should be stalled.

6. The pipelined instruction decoder of claim 5 wherein the powerdown logic further including, a second AND gate to AND the valid indicator of the pipe stage for which the determination is being made with the valid indicator of the next pipe stage, and a third AND gate to AND an output of the second AND gate with an output from the first AND gate, in order to determine if a pipe stage other than the next to last pipe stage should be stalled.

7. The pipelined instruction decoder of claim 2, wherein the pipeline controller to squeeze out bubbles of invalid instructions in the instruction decode pipeline by continuously clocking a pipestage with an invalid instruction until a valid instruction is received and overwrites the invalid instruction.

8. The pipelined instruction decoder of claim 2, wherein the pipeline controller to conserve power by stopping the clocking of the pipelined instruction decoder if there is no valid instruction within the pipelined instruction decoder.

9. The pipelined instruction decoder of claim 2, wherein the pipeline controller to conserve power by stopping the clocking of circuitry in a pipestage if the thread indentification associated with the pipestage indicates a cleared thread of instructions.

10. The pipelined instruction decoder of claim 2, wherein the pipeline controller includes powerdown logic to conserve power.

11. The pipelined instruction decoder of claim 2, wherein the pipeline controller to invalidate an entire thread of instructions in the instruction decode pipeline associated with a thread identification in response to a clear signal.

12. The pipelined instruction decoder of claim 3, wherein the clear logic for each pipe stage of the pipeline controller is responsive to a clear signal to invalidate an entire thread of instructions in the instruction decode pipeline associated with a thread identification.

13. An apparatus comprising:

an instruction decode pipeline to decode instructions associated with a plurality of instruction threads, the instruction decode pipeline having a predetermined number of pipe stages;

a valid bit pipeline in parallel with the instruction decode pipeline, the valid bit pipeline having the same predetermined number of pipe stages in parallel with the predetermined number of pipe stages of the instruction decode pipeline, the valid bit pipeline to associate a valid indicator at each pipe stage with each instruction being decoded in the instruction decode pipeline; and a thread identification pipeline in parallel with the instruction decode pipeline and the valid bit pipeline, the thread identification pipeline having the same predetermined number of pipe stages in parallel with the predetermined number of pipe stages of the instruction decode pipeline and the valid bit pipeline, the thread identification pipeline to associate a thread identification at each pipe stage with each instruction being decoded in the instruction decode pipeline; and a pipeline controller coupled to the instruction decode pipeline, the valid bit pipeline, and the thread identification pipeline, the pipeline controller to squeeze out bubbles of invalid instructions in the instruction decode pipeline by continuously clocking a pipestage with an invalid instruction until a valid instruction is received and overwrites the invalid instruction.

14. The apparatus of claim 13, wherein the pipeline controller to conserve power by stopping the clocking of each of the instruction decode pipeline, the valid bit pipeline, and the thread identification pipeline if there is no valid instruction within the instruction decode pipeline.

15. The apparatus of claim 13, wherein the pipeline controller to conserve power by stopping the clocking of circuitry in a pipestage if the thread indentification associated with the pipestage indicates a cleared thread of instructions.

16. The apparatus of claim 13, wherein
the pipeline controller to invalidate an entire thread of instructions in the instruction decode pipeline associated with a thread identification in response to a clear signal.

17. A system comprising:

a memory; and a microprocessor coupled to the memory, the microprocessor having an instruction decoder, the instruction decoder including
- an instruction decode pipeline to decode instructions associated with a plurality of instruction threads, the instruction decode pipeline having a predetermined number of pipe stages;
- a valid bit pipeline in parallel with the instruction decode pipeline, the valid bit pipeline having the same predetermined number of pipe stages in parallel with the predetermined number of pipe stages of the instruction decode pipeline, the valid bit pipeline to associate a valid indicator at each pipe stage with each instruction being decoded in the instruction decode pipeline; and
- a thread identification pipeline in parallel with the instruction decode pipeline and the valid bit pipeline, the thread identification pipeline having the same predetermined number of pipe stages in parallel with the predetermined number of pipe stages of the instruction decode pipeline and the valid bit pipeline, the thread identification pipeline to associate a thread identification at each pipe stage with each instruction being decoded in the instruction decode pipeline.

18. The system of claim 17, wherein
the instruction decoder further includes
a pipeline controller coupled to the instruction decode pipeline, the valid bit pipeline, and the thread identification pipeline, the pipeline controller to control the clocking of each pipe stage of the instruction decode pipeline, the valid bit pipeline, and the thread identification pipeline.

19. The system of claim 18, wherein
the pipeline controller to squeeze out bubbles of invalid instructions in the instruction decode pipeline by continuously clocking a pipestage with invalid instruction until a valid instruction is received and overwrites the invalid instruction.

20. The system of claim 18, wherein
the pipeline controller to conserve power by stopping the clocking to each pipestage of the instruction decoder if there is no valid instruction therein.

21. The system of claim 18, wherein
the pipeline controller to conserve power by stopping the clocking of circuitry in a pipestage if the thread identification associated with the pipestage indicates a cleared thread of instructions.

22. The system of claim 18, wherein
the pipeline controller to invalidate an entire thread of instruction in the instruction decode pipeline associated with a thread indentification in response to a clear signal.

* * * * *